United States Patent
Cotevino et al.

(10) Patent No.: US 7,979,062 B2
(45) Date of Patent: Jul. 12, 2011

(54) COMMUNICATIONS METHOD BETWEEN A COMBINATIONAL TERMINAL AND MULTIMEDIA TERMINAL

(75) Inventors: Agostino Cotevino, Turin (IT); Roberto Gullino, Turin (IT); Mario Madella, Turin (IT); Davide Mamino, Turin (IT)

(73) Assignee: Telecom Italia S.p.A., Milan (IT)

( * ) Notice: Subject to any disclaimer, the term of this patent is extended or adjusted under 35 U.S.C. 154(b) by 340 days.

(21) Appl. No.: 12/309,679

(22) PCT Filed: Jul. 28, 2006

(86) PCT No.: PCT/IB2006/002170
§ 371 (c)(1),
(2), (4) Date: Jan. 27, 2009

(87) PCT Pub. No.: WO2008/015488
PCT Pub. Date: Feb. 7, 2008

(65) Prior Publication Data
US 2009/0286523 A1 Nov. 19, 2009

(51) Int. Cl.
*H04M 3/00* (2006.01)
(52) U.S. Cl. ......... 455/418; 455/550.1; 455/422.1; 370/352; 709/223
(58) Field of Classification Search ......... 455/418, 455/422.1, 550.1; 709/223; 370/352
See application file for complete search history.

(56) References Cited

U.S. PATENT DOCUMENTS

| 6,791,988 | B1* | 9/2004 | Hameleers et al. | 370/401 |
| 2002/0044200 | A1 | 4/2002 | Leimkoetter | |
| 2004/0249962 | A1* | 12/2004 | Lecomte | 709/229 |
| 2005/0008024 | A1* | 1/2005 | Newpol et al. | 370/401 |
| 2006/0018309 | A1* | 1/2006 | Lee et al. | 370/355 |
| 2006/0056449 | A1* | 3/2006 | Morioka | 370/466 |
| 2007/0180079 | A1* | 8/2007 | Wei et al. | 709/223 |
| 2008/0003996 | A1* | 1/2008 | Strandell et al. | 455/420 |

FOREIGN PATENT DOCUMENTS

| EP | 1 148 688 A1 | 10/2001 |
| EP | 1 170 934 B1 | 1/2002 |
| WO | WO 2004/084457 A2 | 9/2004 |
| WO | WO 2005/027460 A1 | 3/2005 |
| WO | WO 2006/010526 A1 | 2/2006 |

OTHER PUBLICATIONS

Olsson et al.; "Combinational services-The pragmatic first step toward all-IP", Ericsson Review, No. 2, pp. 66-71, (2003).
Nokia Corporation, "http://www.nokia.com/BaseProject/Sites/NOKIA_MAIN_19022/CDA/Categories/Phones/Technologies/VideoSharing/_Content/_Static_Files/video sharing a4_2510.pdf", White Paper, "Video sharing-Enrich your call with video", pp. 1-12, (2004).

* cited by examiner

*Primary Examiner* — Danh C Le
(74) *Attorney, Agent, or Firm* — Finnegan, Henderson, Farabow, Garrett & Dunner, L.L.P.

(57) ABSTRACT

Communication method between a first terminal and a second terminal on a communications network includes establishing a first connection between the terminals, the first connection being of a first media type at the first terminal and of a multimedia type at the second terminal; establishing a second connection between a repository apparatus and the second terminal, the second connection being coupled to the first connection and being of a second media type at the repository apparatus different from the first media type; said multimedia type including the first and the second media types; disabling the second connection after a request for a third connection between the terminals, the third connection being of the second media type at the first terminal; and establishing the third connection, the first and third connections forming a combinational session at the first terminal and a multimedia type connection at the second terminal.

25 Claims, 5 Drawing Sheets

COMMUNICATIONS METHOD BETWEEN A COMBINATIONAL TERMINAL AND MULTIMEDIA TERMINAL

CROSS REFERENCE TO RELATED APPLICATION

This application is a national phase application based on PCT/IB2006/002170, filed Jul. 28, 2006.

TECHNICAL FIELD OF THE INVENTION

The present invention generally relates to the field of communication networks, and particularly, to mobile communication networks. More particularly, the present invention relates to communications between terminals, e.g. mobile phones, implementing different services, such as services based on "multimedia type connections" and "combinational sessions".

BACKGROUND OF THE INVENTION

For the purposes of the present invention, reference is made to the following definitions.

The "media type" of a connection between terminals associated to corresponding users refers to the typology of the content exchanged by the users by means of the connection, which can typically be audio or data. As an example, audio comprises voice (e.g. speech) or music; data comprise at least one of the following contents: images (e.g., moving images such as a video, or still images such as pictures), files, electronic documents, or software applications. With the expression "a connection of a "X" media type" (e.g. audio or data) it is meant that the connection supports and/or allows exchanging of the "X" media type (e.g. audio or data).

With the term "connection of the multimedia type" it is meant a single connection (i.e. a single transmission channel, technique and/or protocol, for example, on a packet or circuit domain) between terminals associated to corresponding users, which supports and/or allows the users to exchange content of more than one media type in the same session, e.g. content comprising both data content and audio content. As an example, a videocall is a multimedia type connection.

Particularly, multimedia type connections have been offered by third generation systems such as UMTS (Universal Mobile Telecommunications System), wherein terminals support videocalls on a circuit channel having a transmission rate of 64 Kbit's. The third generation technology UMTS is based on a W-CDMA technique (WideBand-Code Division Multiple Access).

It has to be noticed that the evolution from the earlier mobile communications systems generations (i.e. first an second generations) to the third generation ones has not yet been completed and, probably, systems of earlier generations will be always maintained together with the systems of the current generation.

With particular reference to videocalls, systems and/or terminals supporting "combinational sessions" can provide users with a service analogous to the videocall but based on non-multimedia type connections and, as an example, based on second generation systems (GSM/GPRS). By the term "combinational session" herein is generally meant a communication session enjoyable through two or more connections at the same time. The connections may be based on different network domains, such as the packet domain and the circuit domain. Particularly, services employing combinational sessions (i.e. combinational services) are typically performed by establishing a first connection of a first media type (such as, for example, a voice connection) and a separated second connection of a different second media type (such as, for example, a video connection) at the same time.

U. Olsson and M. Nilsson, in the article entitled "Combinational services—The pragmatic first step toward all-IP", Ericsson Review No. 2, 2003, describe, inter alia, an example of the so-called "combinational services" in which the possibility is exploited of managing traffic in both circuit connection and packet connection at the same time: image sharing during a conversation between two users. The authors note that traffic can be simultaneously managed in a circuit connection and packet connection both with Wideband Code Division Multiple Access (WCDMA), which allows using multiple and parallel bearers in the "over-the-air" interface (multiple radio access bearers, multi-RAB) and with GSM, in which similar possibilities are offered by a standardized mechanism—the dual transfer mode, DTM.

Another description of a service that can be employed by means of mobile terminals, similar to that discussed above, is given in White Paper "Video sharing—Enrich your voice call with video", by Nokia Corporation, which is available for download at http:/www.nokia.com/BaseProject/Site s/NOKIA_MAIN_18022/CDA/Categories/Phones/TechnologiesNideoSharing/_Content/_Static_Files/video_sharing_a4_2510.pdf The real-time video sharing service allows two users to easily enrich their communication during a telephone conversation. Either of the users can share a live video recorded by a video camera, or video clips on his/her terminal. Both users watch the same video and can discuss the latter while continuing their voice call.

Document WO-A-2004/084457 describes a method for establishing communication between a first wireless terminal supporting audio and video calls and a second wireless terminal supporting audiocalls but not videocalls. According to this method, the first wireless terminal requests to establish a communication with the second terminal. A management module checks whether the second wireless terminal has a video capability and as the second terminal is voice capable only, the call request is sent to a video gateway which sets up a video session between the first wireless terminal and a video server. The video server generates and sends video or picture to the video gateway for transmission to the user of the first wireless terminal. The video or the picture indicates to the user of the first wireless terminal that a voice call is being established between first and second wireless terminals. Moreover, in the above described situation the communication between the first and second wireless terminal can be ended or only a non video session is set up establishing a voice channel between the terminals.

Document EP-A-1148688 discloses a proxy apparatus that allows for communication session set up according to different communication capability. The proxy apparatus receives a request for a communication session originated from a first subscriber using a first group of terminal such as a mobile telephone and a data terminal. The request identifies a second subscriber associated to a multimedia Personal Computer. The proxy apparatus evaluates data and speech as types of communication being available for the first group of terminal and multimedia as types of communication being available for the multimedia Personal Computer. Then, the proxy apparatus sets up terminal sub-session between the groups of terminals available according to types of communication being available. The communication between the terminals above indicated requires merging data and speech into a multimedia data stream for submission to the Personal Computer and splitting of the multimedia data stream into single speech and data streams to be submitted to the mobile telephone and the data terminal.

SUMMARY OF THE INVENTION

The Applicant has tackled the problem of providing an interworking between combinational sessions and connections of the multimedia type in order to make combinational and multimedia services compatible with each other.

The Applicant notes that both the available teachings concerning the combinational services, and those concerning the compatibility of services using multimedia content and single media content are not sufficient for providing a convenient implementation of an interworking between combinational and multimedia services. Particularly, the Applicant notes that prior techniques do not offer any teaching for establishing a multimedia connection coupled to a combinational session.

The present invention relates to a communication method between a first terminal (1) and a second terminal (2) on a communications network (1000), comprising:

establishing a first connection (1001-1010"; 3001-1010"; 4001-4009") between said terminals, the first connection being of a first media type at the first terminal and of a multimedia type at the second terminal;

establishing a second connection (1006-1011'; 4003-4010) between a repository apparatus (7) and the second terminal, the second connection being coupled to said first connection and being of a second media type at the repository apparatus, different from said first media type; said multimedia type comprising the first and the second media types;

disabling (1016-1019; 4017-4018) said second connection after a request for a third connection (1015; 4014) between said terminals, said third connection being of said second media type at the first terminal; and establishing the third connection (1016, 1017; 4016, 4017), the first and third connections forming a combinational session at the first terminal and a multimedia type connection at the second terminal.

In embodiments of the present invention, at least one of said first and second terminals may include a mobile terminal and said network includes a telephone mobile network; or said first media type may be audio media, said second media type may be data media, and said multimedia type may be audio-data media, wherein said second media type may be video.

In other embodiments of the method of the present invention, establishing the first connection (1001-1010"; 3001-1010"; 4001-4009") may include establishing a corresponding connection based on a circuit subnetwork (200) and establishing the third connection may include establishing a corresponding connection based on a packet subnetwork (100); or said first terminal (1) may be a combinational terminal and said second terminal (2) may be a multimedia terminal adapted to support video-calls.

The method of the present invention may further comprise:

merging in a first conversion apparatus (8) first media type content transmitted by the first terminal (1) on the first connection and second media type content transmitted by the repository apparatus (7) on the second connection to form a multimedia content; and transmitting (1021; 4011-4013) said multimedia content toward the second terminal (2);

wherein the second media type content transmitted by the repository apparatus may include at least one of the following content: video, image, advertising, or waiting message; or the method may further comprise:

merging in the first conversion apparatus (8) further contents of the first and second media type transmitted by the first terminal (1) respectively on the first and third connections to form a further multimedia content; and transmitting (1022; 4019) said further multimedia content toward the second terminal (2); or the method may further comprise:

splitting in the first conversion apparatus (8) emitted multimedia content transmitted by the second terminal (2) on the first connection into a first media type content and a second media type content; and transmitting (1013', 1013; 1021; 4011, 4012, 4013) the first media type content toward the first terminal (1) on said first connection; or the method may further comprise:

transmitting (1022) the further second media type content toward the first terminal (1) on said third connection, wherein establishing the second connection (1006-1011'; 4003-4010) between the repository apparatus (7) and the second terminal (2) may include:

configuring (1005; 4008) a switch apparatus (6) in a first operative condition in which the switch apparatus (6) is connected to said repository apparatus (7) for receiving said second media type content and to transmit the second media type content toward the first conversion apparatus (8);

wherein establishing the third connection (1016, 1017; 4016, 4017) may further include:

configuring (1016; 4017) the switch apparatus (6) in a second operative condition in which the switch apparatus (6) receives corresponding second media type content from the first terminal (1) and transmits the corresponding second media type content toward the first conversion apparatus (8);

wherein configuring (1016; 4017) the switch apparatus (6) in a second operative condition may include:

switching receiving/transmitting ports of said switch apparatus (6) from the first operative condition to the second operative condition, which may further comprise:

providing a control device for receiving and transmitting signalling messages to control the communication method; or may further comprise:

transmitting (1013, 1022) on said first connection and from the first terminal (1) said first media type content under the form of an audio signal propagating on a circuit subnetwork (200); and receiving said audio signal at a second conversion apparatus (3) and converting said audio signal into a corresponding audio packet flow propagating on a packet sub-network; or may further comprise:

transmitting the audio packet flow toward the switch apparatus; or may further comprise:

transmitting (1013, 1022) on said third connection and from the first terminal (1) said second media type content under the form of a video packet flow propagating on a packet subnetwork (100); and receiving said video flow at the switch apparatus (6), which may further comprise performing a synchronization of said audio packet flow and video packet flow.

In certain other embodiments of the present invention, said first conversion apparatus (8) may further perform a conversion into signals propagating on a corresponding circuit sub-network (300) of received packet flows, and vice versa.

Said second conversion apparatus (3) may convert signalling messages propagating on the circuit subnetwork into signalling messages propagating on the packet subnetwork, and vice versa, which may be adapted to be processed by said control device (10), wherein the first terminal may comprise a DTM terminal and the second terminal may be a UMTS terminal; or wherein establishing the first connection may include:

transmitting from the first terminal (1) toward the second terminal (2) and via the control device (10) a first signalling request message (1001; 1002) requesting establishment of said first connection of the first media type;

receiving at the control device (10) the first signalling request message and converting it into a second signalling request message (1006) requesting establishment of a connection of the multimedia type;

transmitting (1007) said second signalling request message toward the second terminal (2); and accepting (1008) establishment of said first connection of the multimedia type at the second terminal, wherein establishing the second connection may comprise:

sending from the control device (10) to the switch apparatus (6) a first configuration command message (1005) to configure the switch apparatus in the first operative condition;

sending from the control device (10) to the repository apparatus (7) an enabling command message to allow the repository apparatus supplying said second media type content to the switch apparatus.

Establishing the third connection may comprise:

transmitting from the first terminal toward the control device (10) a third signalling request message (1015) requesting establishment of said third connection of the second media type; and sending from the control device (10) to the switch apparatus (6) a first configuration command message (1019) to switch the switch apparatus from the first operative condition to the second operative condition.

Establishing the first connection may include:

transmitting from the second terminal (2) toward the first terminal (1) and via the control device (10) a fourth signalling request message (4001; 4002) requesting establishment of said first connection of the multimedia type;

receiving at the control device (10) the fourth signalling request message and converting it into a fifth signalling request message (4003) requesting establishment of a connection of the first media type;

transmitting (4004) said fifth signalling request message toward the first terminal (1); and accepting (4009) establishment of said first connection of the first media type at the first terminal (1), wherein establishing the second connection may comprise:

sending from the control device (10) to the switch apparatus (6) a third configuration command message (4008) to configure the switch apparatus in the first operative condition; and sending from the control device (10) to the repository apparatus (7) a respective enabling command message to allow the repository apparatus supplying said second media type content to the switch apparatus.

Establishing the third connection may comprise:

transmitting from the first terminal (1) toward the control device (10) a sixth signalling request message (4016) requesting establishment of said third connection of the second media type; and sending from the control device (10) to the switch apparatus (6) a second configuration command message (4018) to switch the switch apparatus from the first operative condition to the second operative condition, wherein switching the switch apparatus from the first operative condition to the second operative condition may produce the disabling of said second connection.

The present invention also relates to a communications network (100) comprising:

a first terminal (1) supporting combinational sessions;

a second terminal (2) supporting connections of the multimedia type, the first and second terminals being adapted to establish a first connection between said terminals, the first connection being of a first media type at the first terminal and of said multimedia type at the second terminal;

a repository apparatus (7) storing second media type content and adapted to establish a second connection toward the second terminal, the second connection being coupled to said first connection and being of a second media type at the repository apparatus, different from said first media type; said multimedia type comprising the first and the second media types; and a switch apparatus (6) adapted to selectively assume:

a first operative condition in which the switch apparatus (6) is connected to said repository apparatus (7) for forwarding the second media type content to the second terminal and the first and second connections are established, and a second operative condition in which the switch apparatus (6) is disconnected from the repository apparatus (7) and is connected to the first terminal (1); in the second operative condition, a third connection of said second media type at the first terminal being established; the first and third connections forming a combinational session at the first terminal and a multimedia type connection at the second terminal, wherein at least one of said first and second terminals may include a mobile terminal and said network may include a mobile network, or wherein said first media type may be audio media, said second media type may be data media, and said multimedia type may be audio-data media, or wherein said second media type may be video.

The network may include a circuit subnetwork (200) and a packet subnetwork (100); or the network may further comprise a conversion apparatus (8) for merging first content of the first media type and second content of the second media type to form third content of the multimedia type and splitting the third content of the multimedia type into separated corresponding contents of the first and second media types.

BRIEF DESCRIPTION OF THE DRAWINGS

To better understand the present invention and appreciate the advantages thereof, a number of non-limiting, exemplary embodiments of the same will be described below, with reference to the annexed figures, in which.

DESCRIPTION OF PREFERRED EMBODIMENTS

Figure 1:
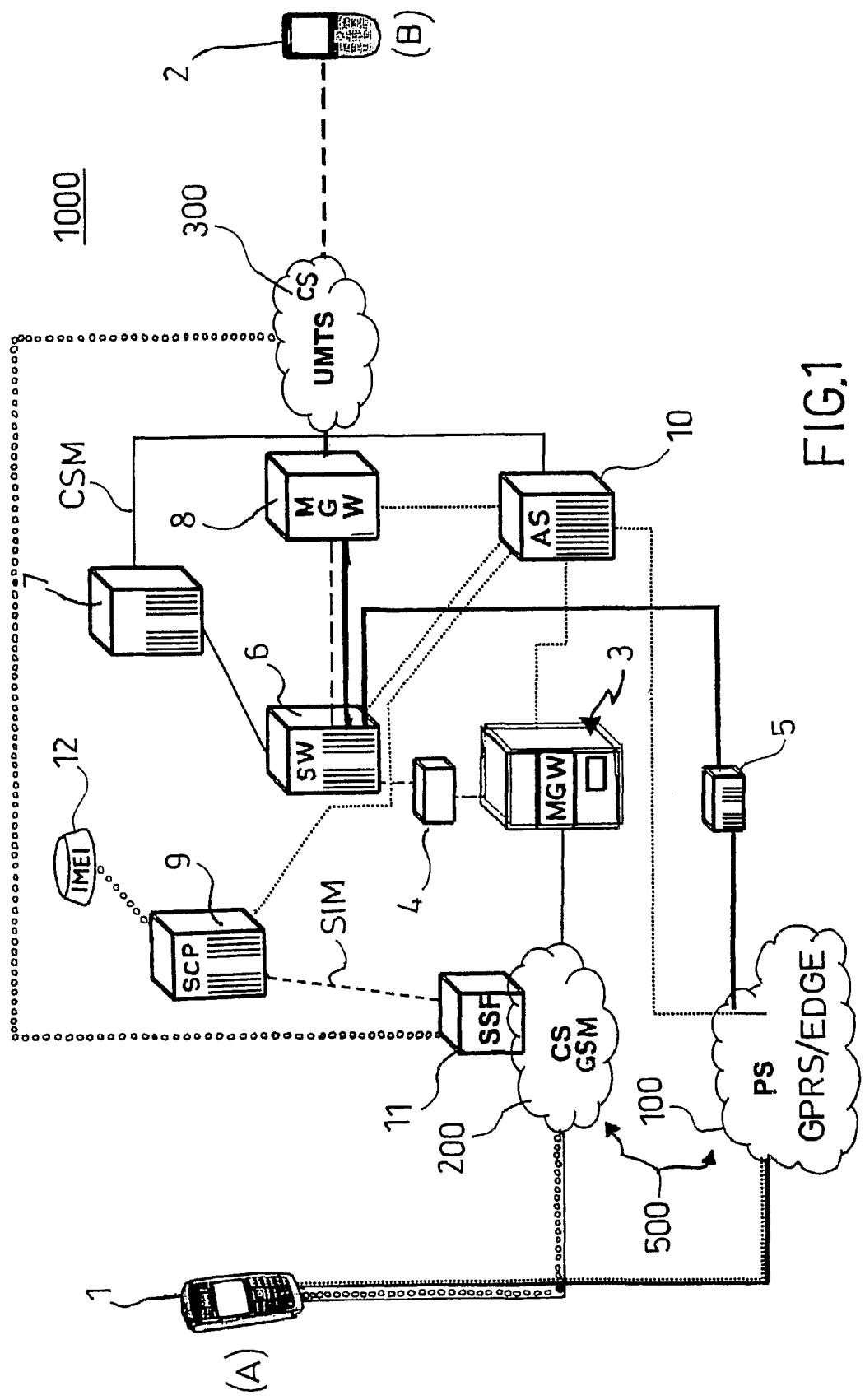
FIG. 1 shows an example of a telecommunications network 1000 supporting a communication method in accordance with embodiments of the invention, comprising a combinational terminal and a multimedia terminal.

FIG. 1 shows an example of a communications network 1000 supporting a communication method in accordance with embodiments of the invention and comprising at least a first telecommunication terminal 1 and at least a second telecommunication terminal 2, which are associated with a first user A and a second user B, respectively. The network 1000 may comprise a greater number of terminals.

In accordance with a preferred embodiment, the first 1 and the second 2 terminals may be mobile phones (such as cell phones) or Personal Digital Assistant (PDA) devices. While reference will be made herein below to mobile terminals, the terminals 1 and 2 may be communication terminals of the non-mobile type (e.g. fixed phones).

In any case, the first terminal 1 is of a type which allows using a combinational session and then it is adapted to operate with two different connections at the same time, such as connections based on a packet subnetwork 100 (PS) and circuit subnetwork 200 (CS). The two connections established by the first terminal 1 may also be based on the same (e.g., either circuit or packet) subnetwork but, however, they relate to distinct media type such as, audio content and data content.

Particularly, the first terminal 1 is a GPRS/EDGE/DTM mobile terminal, a UMTS terminal (operating a Multi-RAB modality) or a Dual Mode terminal 2.5-3G/WiFi, being capable of performing a voice call based on the circuit subnetwork 200 and a further communication based on the packet subnetwork 100. As it is known, EDGE (Enhanced Data rates for GSM Evolution) is an evolution of the standard GPRS (General Packet Radio Service) dedicated to the data transfer on a second generation, e.g. GSM (Global System for Mobile Communications), network.

DTM (Dual Transfer Mode) is a technology based on a GSM standard which allows to perform a combinational session and in particular an audio communication on the circuit subnetwork 200 and, at the same time, data transfer on the packet subnetwork 100. As above indicated, the multi Radio Access Bearer modality (RAB) allows a UMTS (Universal Mobile Telecommunications System) system to be used for performing a combinational session. Dual Mode terminal 2.5-3G/WiFi allows to perform a combinational session using two different domains at the same time: the audio content on the circuit domain (i.e. 2.5-3G) and the data content through the packet domain (i.e.e. using Wifi radio access technology).

Figure 5:
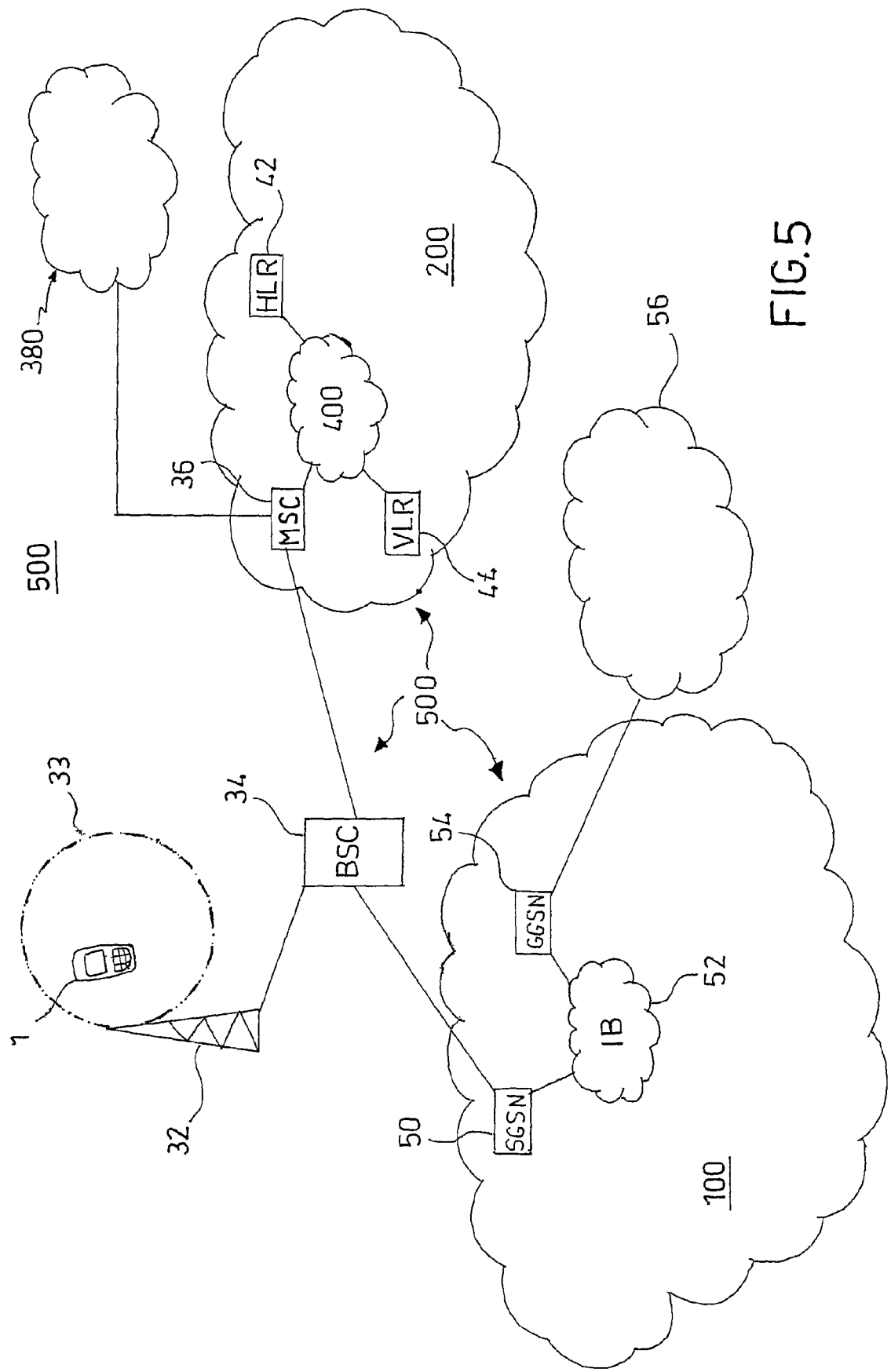
FIG. 5 shows a mobile subnetwork included in the network shown in FIG. 1.

The DTM first terminal 1 can operate on a first mobile network 500 (e.g. a GSM network) including the circuit subnetwork 200 and the packet subnetwork 100, shown in greater detail in FIG. 5.

The GSM network 500 includes one or more Base Transmitter Stations BTS 32 communicating on a radio interface with the first terminal 1. Each base transmitter station 32 supplies a mobile telephone service in a corresponding geographical area 33 which is commonly known as the "cell". Different Base Transmitter Stations 32 are connected to a Base Station Controller-BSC 34, that manages the allocation and deallocation of radio resources and controls handovers of the mobile terminals from a base transmitter station to another. A BSC 34 and the BTS 32 being associated therewith are typically indicated as the Base Station Subsystem (BSS). The BSC 34 is connected to a Mobile Switching Center (MSC) 36 in the circuit subnetwork 200, through which the circuit connections can be also established to other circuit networks 380, such as Public Switched Telephone Networks (PSTNs) or Integrated Services Digital Networks (ISDNs). Typically, in capillary mobile networks, a plurality of BSCs, such as BSC 34 is connected to an individual MSC.

The MSC 36 is also connected, through a signalling network 400 (for example, a signalling network according to the Signalling System #7, or SS7) to a Home Location Register (HLR) 42, and a Visitor Location Register (VLR) 44. The VLR 44 includes a database containing information concerning all the mobile terminals which are instantaneously present in a corresponding geographical area, such as temporary subscription data of the mobile service subscribers, which are required by MSC for supplying services in that geographical area.

The HLR 42 comprises a database which stores and manages the subscriptions of the users. For each subscriber, the HLR contains permanent subscription data, such as for example the telephone number (Mobile Station ISDN, or MSISDN), and an International Mobile Subscriber Number (IMSN), i.e. an international unique identifier which is allocated to each subscriber and used for signalling in the circuit domain of mobile networks. Additionally, the HLR 42 contains a list of services that a mobile network subscriber is authorized to use (in a so-called "profile"), and the address of the VLR which is instantly serving this subscriber.

Each BSC 34 is also connected to the packet subnetwork 100 by a Serving GPRS Support Node (SGSN) 50, which is responsible for the delivery of the packets to the mobile terminals which are within its service area. In capillary mobile networks, a plurality of BSC is connected to an individual SGSN. A Gateway GPRS Support Node (GGSN) 54 acts as the logic interface to external packet networks, such as for example an external network IP 56 (for example, the Internet). The nodes SGSN 50 and GGSN 54 are typically connected to each other by an IP network 52.

Referring back to FIG. 1, the second terminal 2 is adapted to support and establish a multimedia type connection based on a packet or a circuit subnetwork for exchanging multimedia content, that is to say comprising both data type content and audio type content. As an example, a videocall is a multimedia type connection.

Preferably, the second terminal 2 can be an UMTS terminal supporting videocalls on the UMTS circuit subnetwork 300. As known, mobiles phones which operate in accordance with, e.g., the standard UMTS Rel. 99 can perform videocalls on a circuit channel having a transmission rate of 64 Kbit/s.

The UMTS network 300 is of conventional type and its architecture is very similar to the architecture shown in FIG. 5.

In each of the first terminal 1 and second terminal 2 a software application for controlling and managing the combinational session and the multimedia connection, respectively, is installed. This software application can be provided as a separate client application, that can be either installed on the mobile terminal operating system, or "cabled" in the mobile terminal firmware. Particularly, the software application comprises modules configured for controlling the establishment of the connections from the first terminal 1 (or, respectively, the second terminal 2) to the circuit subnetwork 200 and the packet subnetwork 100 (or, respectively, the UMTS circuit subnetwork 300). The software application can be started automatically upon switching on the first and/or second terminal. It may be provided, however, that the user can disable the automatic start of the application, or that the application is manually run by the user. Preferably, the software application operates in the background such that it is practically "invisible" to the user during the normal use of the mobile terminal. When executed, the software application can identify the signalling of events related to calls that have been made to and/or from the mobile terminal.

The network 1000 further includes apparatuses and equipment allowing to enable a communication between the first terminal 1 and the second terminal 2 which integrates a combinational session established at the first terminal 1 and a multimedia connection established at the second terminal 2. Particularly, the network 1000 allows the first terminal 1 to establish a combinational session to exchange video and audio contents with the second terminal 2 at which a videocall (i.e. a multimedia connection) is established. The network 1000 comprises a first conversion apparatus 3 (Media GateWay, MGW), an audio delay adapter 4, a video rate adapter 5, a switch apparatus 6 (SW), a repository apparatus 7 and a second conversion apparatus 8 (i.e. a second Media GateWay, MGW).

The first conversion apparatus 3 comprises a media gateway (MGW) configured for converting signals coming from the circuit sub-network 200 into packet flows adapted to be transmitted along a packet sub-network, and vice versa. Particularly, the first conversion apparatus 3 is adapted to convert GSM audio flow exiting the circuit subnetwork 200 into a flow in accordance with the known RTP (Real-Time Transport Protocol) audio, and vice versa. RTP is a standard Internet protocol for the real-time transmission of different types of media contents. Moreover, the first conversion apparatus 3 is also adapted to perform the conversion of the signaling messages propagating along a packet sub-network (e.g. in accordance with a SIP protocol) into corresponding messages to be propagated along a circuit sub-network (e.g. in accordance with a ISUP (ISDN User Part) protocol, or SS7), and viceversa.

The audio delay adapter 4 allows to perform a synchronization of the audio packet flow exiting the first conversion apparatus 3 with video packet flows transmitted on the packet sub-network 100 when a communication between the first 1 and the second terminal 2 has been established. The video rate adapter 5 allows to perform processing of video packet flows, e.g. in order to modify the bit rate and/or other parameters such as the bandwidth, the frame rate and/or the quality of video packet flows, to solve compatibility issues between the first and second terminals 1 and 2.

The repository apparatus 7 is a device (such as, for example, a server) capable of storing and transmitting data content and, particularly, video content to be sent, as an example, to the second terminal 2, in particular operating conditions. For example, the repository apparatus 7 is capable of transmitting video flows in accordance with the above mentioned protocol RTP.

The switch apparatus 6 has input/output ports respectively connected to the repository apparatus 7, a second conversion apparatus 8 (see below), the video rate adapter 5, the audio delay adapter 4 and an application server 10 (see below). The switch apparatus 6 can assume a first operative configuration wherein the input/output ports are disabled/enabled in such a way that said switch apparatus sends towards the second conversion apparatus 8 a packet flow received from the repository apparatus 7. The switch apparatus 6 can assume a second operative configuration (alternative to the first one) wherein the input/output ports are disabled/enabled in such a way that said switch apparatus sends towards the second conversion apparatus 8 a packet flow received from the first terminal 1 through, in accordance to the example, the video rate adapter 5 and the packet subnetwork 100. In other words, the switch apparatus 6 can be switched to selectively assume a first configuration in which a connection is set up between the second conversion apparatus 8 and the repository apparatus 7 and a second configuration in which the second conversion apparatus 8 is disconnected from the repository apparatus 7 but is connected to the first terminal 1.

The second conversion apparatus 8 is configured to perform a conversion of the received flows/signals from the packet domain to the circuit domain and vice versa. Furthermore, with the second conversion apparatus 8 also performs a processing for merging separated audio and video flows into a multimedia flow. Vice versa, the second conversion apparatus 8 also performs a processing for splitting a multimedia flow into separated audio and video flows.

In other words, the second conversion apparatus 8 can receive on separated inputs the audio RTP flow and the video RTP flow exiting the audio delay adapter 4 and the video delay adapter 5, respectively (switched by the switch apparatus 6), and combine them in a multimedia flow (e.g. voice and video) suitable to be transmitted on the circuit subnetwork 300 for reaching the second terminal 2.

Moreover, the second conversion apparatus 8 can receive on a single input the multimedia flow on a circuit domain connection and split it into separate audio and video flows on packet domain connections.

According to a particular example, the system 1000 includes a control device 10 for controlling some of the apparatuses above described. Particularly, the control device 10 is configured to exchange signalling messages at least with the first terminal 1 via the first conversion apparatus 3, the switch apparatus 6, the second conversion apparatus 8, the repository apparatus 7 and the second terminal 2 via the second conversion apparatus 8. The communications method in accordance with the invention, examples of which will be described later, can be carried out under the control of such device 10.

Preferably, the control device 10 can be implemented as an application server (AS) of the type normally employed in networks using IMS (IP Multimedia Subsystem) technology. The messages transmitted from or received at the application server 10 can be SIP messages (Session Initiation Protocol).

In accordance with a further preferred embodiment, system 1000 comprises an intelligent network subsystem for the control of the circuit connections. As known to the skilled person, an Intelligent network subsystem is an architecture that separates service logic from switching functions, allowing new services to be added without impact on switching layer. New services can thus be rapidly introduced into the network to meet individual customers needs.

FIG. 1 shows some of the main network elements of the intelligent network employed, such as, a service control point 9 (SCP), providing the service control and connected to the application server 10, a service switching function element 11 (SSF) which can perform an interface function between the circuit networks 200 and the service control point 9, connected in FIG. 1 by an outlined line (the network 300 can be also connected to the SCP 9). The service control point 9 can be connected to an IMEI server 12, i.e. a server storing the IMEI (International Mobile Equipment Identifier) of the first terminal 1, the second terminal 2 and other terminals operating in the system 1000.

Alternatively to the intelligent network, a GateWay Open Service Access (OSA) architecture can be used. The standard OSA defines an architecture that enables service application developers to make use of network functionality through an open standardized interface.

With reference to FIG. 1, the following representations of the different type of connections has been employed.

Connections relating to content exchanges (i.e. signals including payload):
  thin continuous line: audio type circuit connection (e.g. audio GSM signal);
  thin outlined line: audio type packet connection (e.g. audio RTP packets);
  bold continuous line: video type packet connection (e.g. video RTP packets);
  bold outlined line: multimedia flow (e.g. video and audio UMTS circuit flow).

Connection relating to signalling:
  thin dotted line: packets signalling messages (e.g. SIP protocol);
  bold dotted line: circuit signalling messages (e.g. GSM signals);
  dotted line indicated with $SI_M$: circuit signalling messages for the intelligent network.

Figure 2:
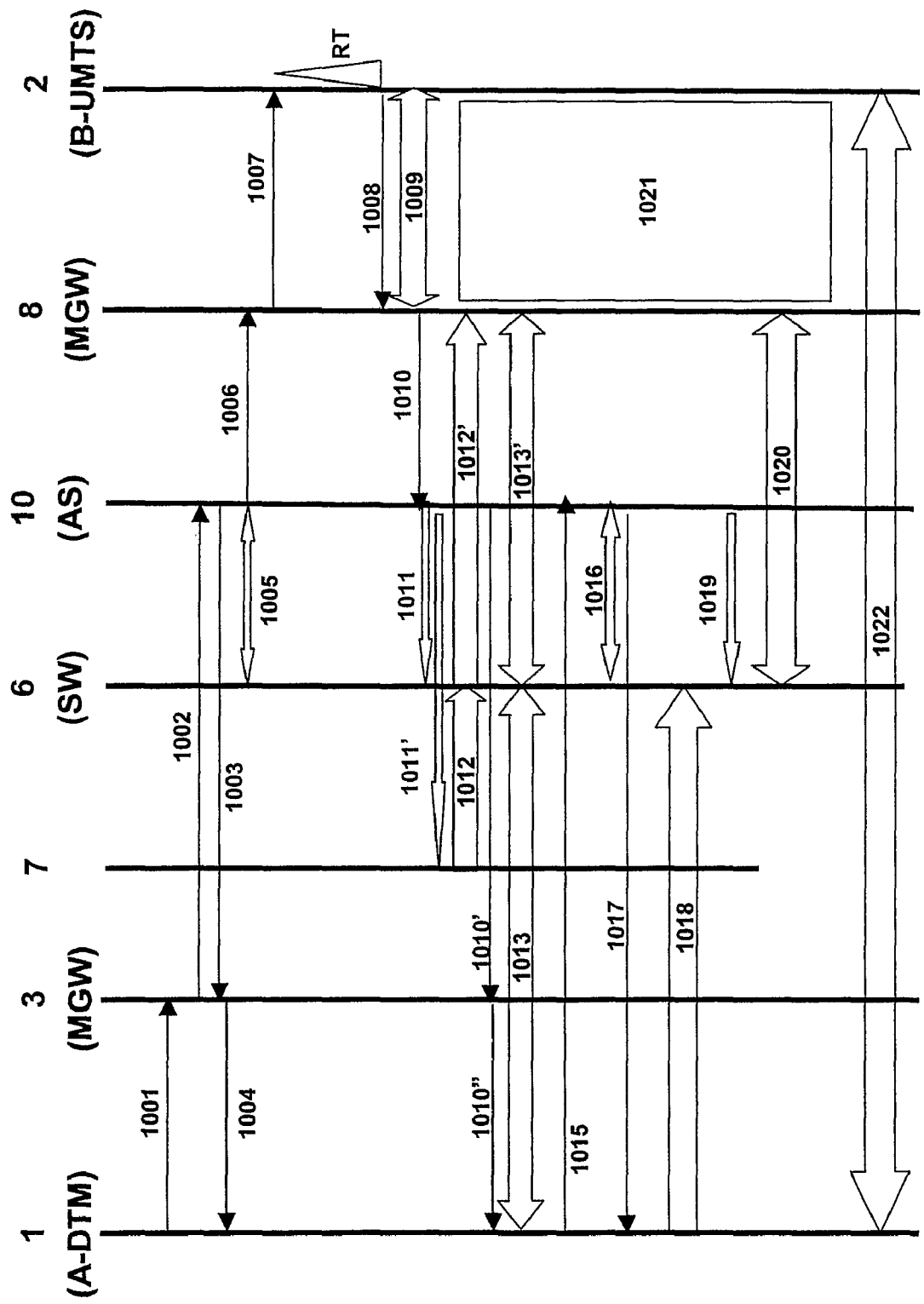
FIG. 2 is diagram showing a first example of a communication method in accordance with the invention, wherein a request for an audio connection is transmitted by the combinational terminal.

In FIG. 2 there is shown the call-flow required for establishing a connection between the first terminal 1 and the second terminal 2 according to a first embodiment. This first embodiment refers to the case in which the first user A requests establishment of a combinational session (e.g. audio and video connections) terminated as conventional videocall at the terminal of user B.

As will be more clear later, the method of FIG. 2 includes establishing a first connection between the first terminal 1 and the second terminal 2. This first connection is of a first media type at the first terminal 1 and of a multimedia type at the second terminal 2.

In greater detail and according to the particular example considered, the first user A, employing a client software stored in the first terminal 1, starts a combinational session towards the second terminal 1.

In the present example, the client software of the first terminal 1 initially sends a Request for Setting Up an Audio Call 1001 towards the second terminal 2. For example, the request can be sent by the first user A by dialing the MSISDN identifier (Mobile Station ISDN) associated with the second terminal 2 together with a pre-established number (such as a prefix) which identifies the combinational service required. The dialing of such numbers can be performed by means of a keyboard of the first terminal 1. The Request for Setting Up the Audio Call 1001 is a circuit signalling message which is transmitted along the circuit subnetwork 200 (see FIG. 1), that forwards it to the first conversion apparatus 3.

The first conversion apparatus 3 converts the circuit signaling (e.g. ISUP signaling) into packet signaling (e.g. SIP signaling) and transmits towards the application server 10 a corresponding Audio Session Invite 1002. The application server 10 receives the Audio Session Invite 1002 and sends, towards the first conversion apparatus 3, a confirmation message 1003 which indicates that application server 10 is processing the Audio Session Invite 1002 and the apparatus 3 should wait the end of the processing. The confirmation message 1003 is converted in a circuit domain signal by the first conversion apparatus 3 and is forwarded (1004) to the first terminal 1.

Moreover, the application server 10 is configured (by means of suitable software) to recognize that the received Audio Session Invite 1002 has been generated in the context of a videocall service and, notwithstanding an audio call has been initially requested by the client software of first terminal 1, a videocall has to be established between the two terminals 1 and 2. The application server 10 can recognize that a videocall has to be established at the second terminal 2 by looking up at a register (such as an IMEI server) which comprises a database storing and managing the profile of the users.

In the present case the IMEI server indicates to the application server 10 that a videocall could be established at the called user side, or that when the user B is called, a videocall has to be established at his terminal. According to an alternative implementation, the method of FIG. 2 may provide for the establishing of a videocall at the called terminal, for any calling user employing a DTM terminal or another combinational terminal.

In accordance with the example, the application server 10 performs a ports set up (1005) by receiving from the switch apparatus 6 identifiers of its ports to be used for the connection that has to be established and by configuring the ports of switch apparatus 6 to receive signals from the repository apparatus 7 and send signals to the conversion apparatus 8, i.e. to assume the above defined first configuration.

In addition, the application server 10 transmits towards the second conversion apparatus 8 an Invite (1006) (containing both audio and video media codec descriptions), requesting the set up of a videocall at the second terminal 2. The Audio-Video Invite 1006 may include, inter alia, the above mentioned switch apparatus port identifiers in order to allow the second conversion apparatus 8 to correctly exchange packet flows with the switch apparatus 6. The second conversion apparatus 8 converts the SIP message Audio-Video Invite 1006 into a Set Up Videocall Request 1007, carried by a circuit signaling and which reaches the second terminal 2.

The second terminal 2 receives the message Set Up Videocall Request 1007 and, after a ringing tone (RT), responds to the received call causing the transmission towards the second conversion apparatus 8 of a Connect message 1008, representing the acceptance of the Request 1007.

A negotiation 1009 of the coding and decoding techniques to be employed for the video and audio signals occurs under the control of the application server 10. This negotiation ensures that the repository apparatus 7, the second conversion apparatus 8, the first 1 and the second terminal 2 will employ the same or at least compatible coding-decoding techniques, for example AMR or G723 coding for audio signals, and MPEG (Moving Picture Experts Group) or H263 coding for video signals.

The above mentioned Connect message 1008 is converted by the second conversion apparatus 8 in a corresponding confirmation message 1010 (e.g. a 200 OK message according to the SIP protocol), which reaches the application server 10. With reference to the video type connection, the application server 10 sends a message 1011 to the switch apparatus 6 in order to enable a connection between said switch and the second conversion apparatus 8.

The application server 10 further sends a message 1011' to the repository apparatus 7 with which it requires that the repository apparatus 7 supplies a video packet flow (for example, according to the RTP protocol) to the switch apparatus 6, which sends it to the second conversion apparatus 8 (arrows 1012 and 1012' FIG. 2). The video packet flow 1012, 1012' may include an image showing a waiting message (e.g. "Please wait—Videocall to be completed") or, as another example, it may be a video having commercial content (such as an advertising), news or a movie.

Coming back to the confirmation message 1010, the application server 10 sends an analogous message 1010' to the first conversion apparatus 3 which converts it in a Connect signal 1010''. The connect signal 1010' is sent to the first terminal 1 on the switching circuit subnetwork 200. At the end of the above transaction, said first connection between the first 1 and the second terminal 2 is established. The first connection established in accordance with the example considered, is of the audio type at the first terminal 1 and is of the audio-video type (i.e. a videocall) at the second terminal 2.

At this step, a phone conversation can occur between the users of the first terminal 1 and the second terminal 2.

With reference to the first connection, the first terminal 1 sends (FIG. 1) to the circuit subnetwork 200 audio signals (e.g., according to the GSM protocol) which reach the first conversion apparatus 3. According to the embodiment described, the first conversion apparatus 3 converts the received audio signal into corresponding packet flow suitable to be propagated on a packet subnetwork. For instance, a conversion apparatus 3 converts the received audio signals into packet flow according to the Real-Time Transport Protocol, RTP.

According to the example described, the audio packet flow is supplied to a pre-selected port of the switch apparatus 6 (through the delay adapter 4), which forwards it towards the second conversion apparatus 8. In FIG. 2, the above described transmission of the audio signal from the first terminal 1 to the second conversion apparatus 8 is represented by means of the arrows 1013, 1013'. It has to be observed that both the audio packet flow 1013-1013' and the video packet flow 1012-1012' are, advantageously, collected at the same switch apparatus 6 in order to simplify the signaling operations of the application server 10 which can thus send command messages relating audio and video to a single apparatus.

The conversion apparatus 8 receives both the video packet flow 1012-1012' from the repository apparatus 7 and the audio packet flow 1013-1013' from the first terminal 1 and merges them in a multimedia signal 1021 which is sent on the videocall connection established at the second terminal 2. In addition to merging the two flows, the second conversion apparatus further performs a conversion of the received packet flow in a multimedia signal adapted to be transmitted into a circuit domain and propagating along the UMTS circuit subnetwork 300.

It has to be noticed that the audio type connection (i.e. a single media type connection) established at the first terminal 1 and the videocall type connection (i.e. a multimedia type connection) established at the second terminal 2 are "coupled" each other, as they allow a communication between the users A and B. Particularly, these coupled connections allow exchanging audio content at least on a common transmission link, such as the one connecting the second conversion apparatus 8 and the second terminal 2.

In accordance with the particular example described, only when the audio call is established, the software client of the first terminal 1 starts the transaction necessary to set up another connection (on the packet domain) for exchanging also video content with the second terminal 2. Particularly, the software client of the first terminal 1 sends to the application server 10 an Invite for a Video Session 1015 towards the user B, in accordance with the SIP protocol. The SIP message 1015 requesting a video connection is a packet message which reaches the application server 10. The application server 10 reads and recognizes the request received and then dialogs through messages 1016 with the switch apparatus 6 in order to configure this apparatus to receive the video packet flow from the first terminal 1 through the packet subnetwork 100.

Then, the application server 10 sends to the first terminal 1 a confirmation message 1017, in accordance with the SIP protocol and the first terminal 1 transmits the video content on the packet subnetwork 100 and towards the switch apparatus 6 (arrow 1018 in FIG. 2).

It has to be noticed that the whole connection established after the transmission of the confirmation message 1017 is a particular example of a connection which forms, together with the previously set up first (audio) connection, a combinational session at the first terminal 1 and a multimedia type connection at the second terminal 2.

The application server 10 also sends to the switch apparatus 6 a switching message 1019. In response to said switching message the switching apparatus 6 switches assuming the above defined second configuration and, then, it disables the connection with the repository apparatus 7 by configuring one of its port to receive video packet flow from the first terminal 1 through the packet subnetwork 100, and send them towards the second conversion apparatus 8, and vice versa.)

Preferably, the switching message 1019 is sent after and not before the transmission of the video packet flow 1018. This allows to not discontinue the reception at the second terminal 2 of the video packet flow generated by the repository apparatus 7 without replacing it with video packet flow generated by the first terminal 1, with the consequent risk of an interruption of the communication between the second conversion apparatus 8 and the second terminal 2.

With reference to the flow 1018, the first terminal 1 sends the video packet flow 1018 according to, for example, the RTP protocol. This packet flow is, advantageously, processed by the video rate adapter 5, that manages the transmission rate in order to adapt it to the bandwidth of the UMTS subnetwork 300. Audio packet flow supplied to the audio delay adapter 4 is suitably delayed in order to achieve a substantial synchronization with videos sent by the first terminal 1. The action of the audio delay adapter could be controlled by the application server 10.

The adapted video packet flow reaches the switch apparatus 6 which forwards it to the second conversion apparatus 8 (arrow 1020). The second conversion apparatus 8 merges the received video packet flow 1020 and the audio packet flow 1013, generated in accordance with a combinational session, obtaining a multimedia flow 1021, and sends the multimedia flow 1021 to the second terminal 2.

With reference to the audio and video signals sent on the established videocall in a multimedia flow by the second terminal 2, such multimedia flow reaches the second conversion apparatus 8, which performs a splitting of the two media contents and a corresponding conversion in separate packet flows, according, as an example, the RTP protocol. The audio packet flow and the video packet flow resulting from the splitting performed by the second conversion apparatus 8 are transmitted towards the circuit subnetwork 200 and the packet subnetwork 100 in a manner analogous to the transmission steps relating to the other direction link.

Particularly, the audio packet flow is sent through the switch apparatus 6, the delay audio adapter 4, the first conversion apparatus 3 and, through the circuit subnetwork 200, reaches the first terminal 1. The video packet flow is sent through the switch apparatus 6, the video rate adapter 5 and, through the packet subnetwork 100, reaches the first terminal 1.

It has to be observed that the operations following the step 1016 can be performed without an additional coding-decoding negotiation since they can be based on the same negotiation occurred at step 1009. The exchange of audio and video contents on the established combinational session at the first terminal 1 and on the multimedia connection at the second terminal 2 is represented in FIG. 2 by means of an arrow 1022.

Moreover, it has to be noticed that the call flow above disclosed with reference to FIG. 2 is also descriptive of another operative condition according to which the first user A does not request a videocall from the beginning but, initially, he requests an audio call and, subsequently, starts a videocall in order to supply to the second terminal 2 a video content together with the already operating audio conversation. In this case, the message Invite for a Video Session 1015 is sent only when the first user A requests the video connection.

This situation is typical of combinational services which allow to easily enrich communication with a video that can be watched by the users during the telephone conversation. The same consideration are valid when the first user A wishes to send other type of data such as still image or electronic documents to the first user.

Figure 3:
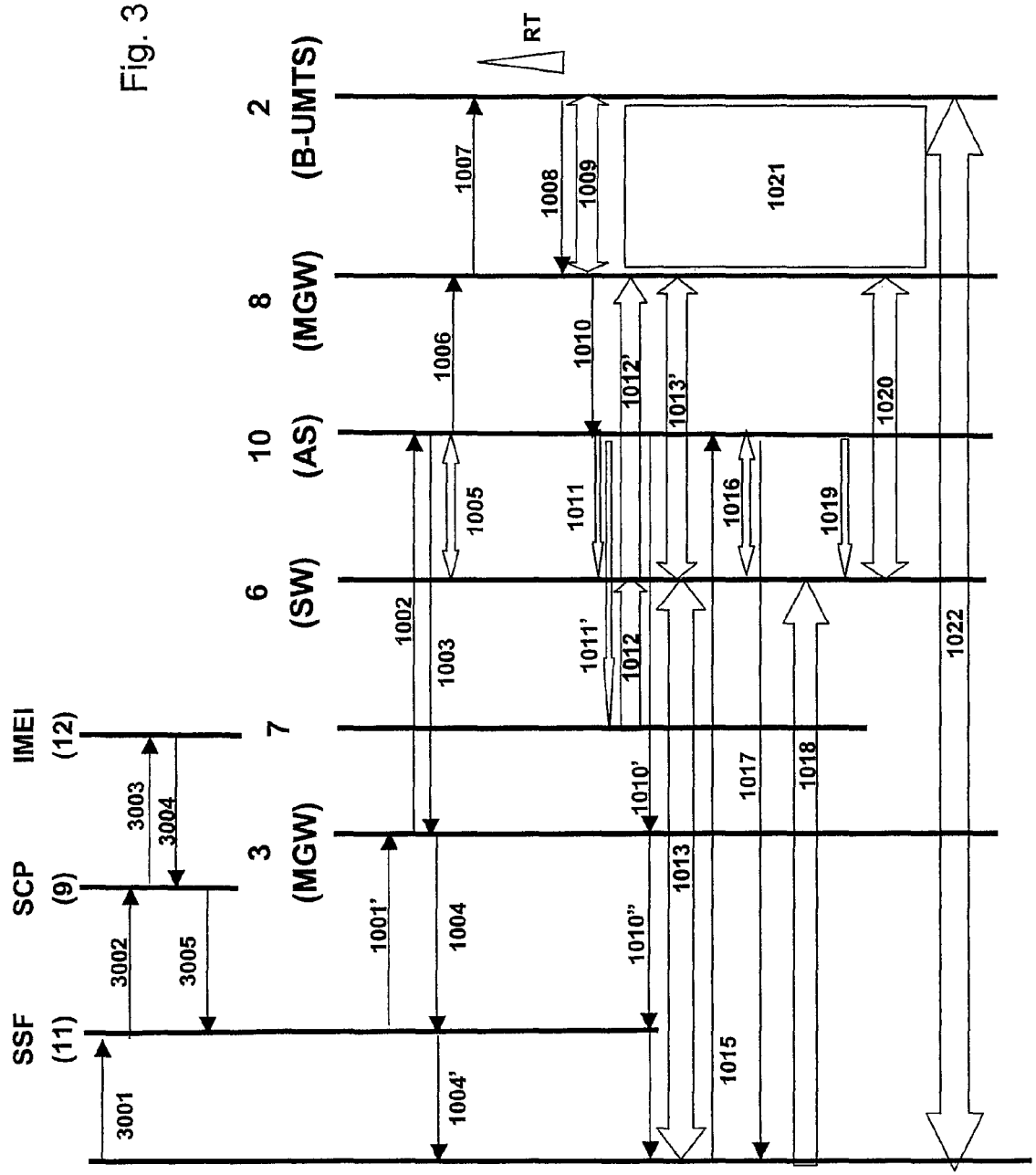
FIG. 3 is a diagram showing an example of a communication method alternative to said first example.

FIG. 3 shows a diagram concerning the embodiment of the system 1000 including the intelligent network subsystem. The diagram of FIG. 3, analogously to the one of FIG. 2, refers to the situation wherein the first user A requests that a combinational session is established with the user B. Before establishing the audio and the video connections at the first terminal 1 and the videocall at the second terminal 2, the intelligent network equipments are employed to verify whether the second terminal 2 is a terminal which can support videocalls.

In greater detail, the client software of the first terminal 1 generates, in a conventional manner, a Request for Setting Up an Audio Call 3001. As an example, this request may include a specific service identifier (e.g. a number) sent by the first terminal 1 and which can be digitized by the first user A.

The request 3001 is sent to the circuit subnetwork 200 and is received by the element SSF 11 which recognizes the service identifier received. On the basis of such Identifier, the element SSF 11 forwards a corresponding request 3002 to the service control point 9 (SCP). The service control point 9 performs a check operation by transmitting to the IMEI server 12 a query 3003 asking whether the second terminal 2 is a UMTS terminal supporting a videocall. The service control point 9 may look up to other types of profile servers too, such as the Home Location Register (HLR) 42.

According to the example described, the IMEI server 12 replies to the query 3003 with an affirmative response 3004 specifying that the second terminal 2 is suitable for the requested videocall. Then, the service control point 9 sends towards the element SSF 11 a connect message 3005 indicating that the connection can be established and providing the necessary address information needed to contact the first conversion apparatus 3.

The element SSF 11 sends to the first conversion apparatus 3 a further Request for Setting Up an Audio Call 1001', corresponding to the request 3001. Following to the above indicated steps performed under the control of the intelligent network subsystem, the method of FIG. 3 proceeds with messages and transmission steps analogous to the ones described with reference to FIG. 2, which are, therefore, indicated in FIG. 3 with the same reference numbers and will not be described again.

After the establishing of the connection between the two terminals 1 and 2 for the exchange of audio content, the application server 10 acts in such a way that videos downloaded from the repository apparatus 7 are supplied to the second terminal 2 and can be displayed to the second user B.

Following the set up of the audio call, the client software of the first terminal 1 sends to the application server 10 the Invite for a Video Session (1015, FIG. 3) with the user B. This Invite for a Video Session 1015 can be generated automatically by the first terminal 1 or can be sent on user's request.

Moreover, in the case in that the signaling messages 3003 and 3004 (FIG. 3) checking the possibility of supporting a videocall for the second terminal 2, produces a negative answer, the service center point 9 terminates the procedure for establishing the videocall shown at FIG. 3. For example, the service center point 9 may cause the element SSF 11 to establish a normal audio connection between the first terminal 1 and the second terminal 2, operating on the circuit subnetwork 200 and the UMTS circuit subnetwork 300.

Figure 4:
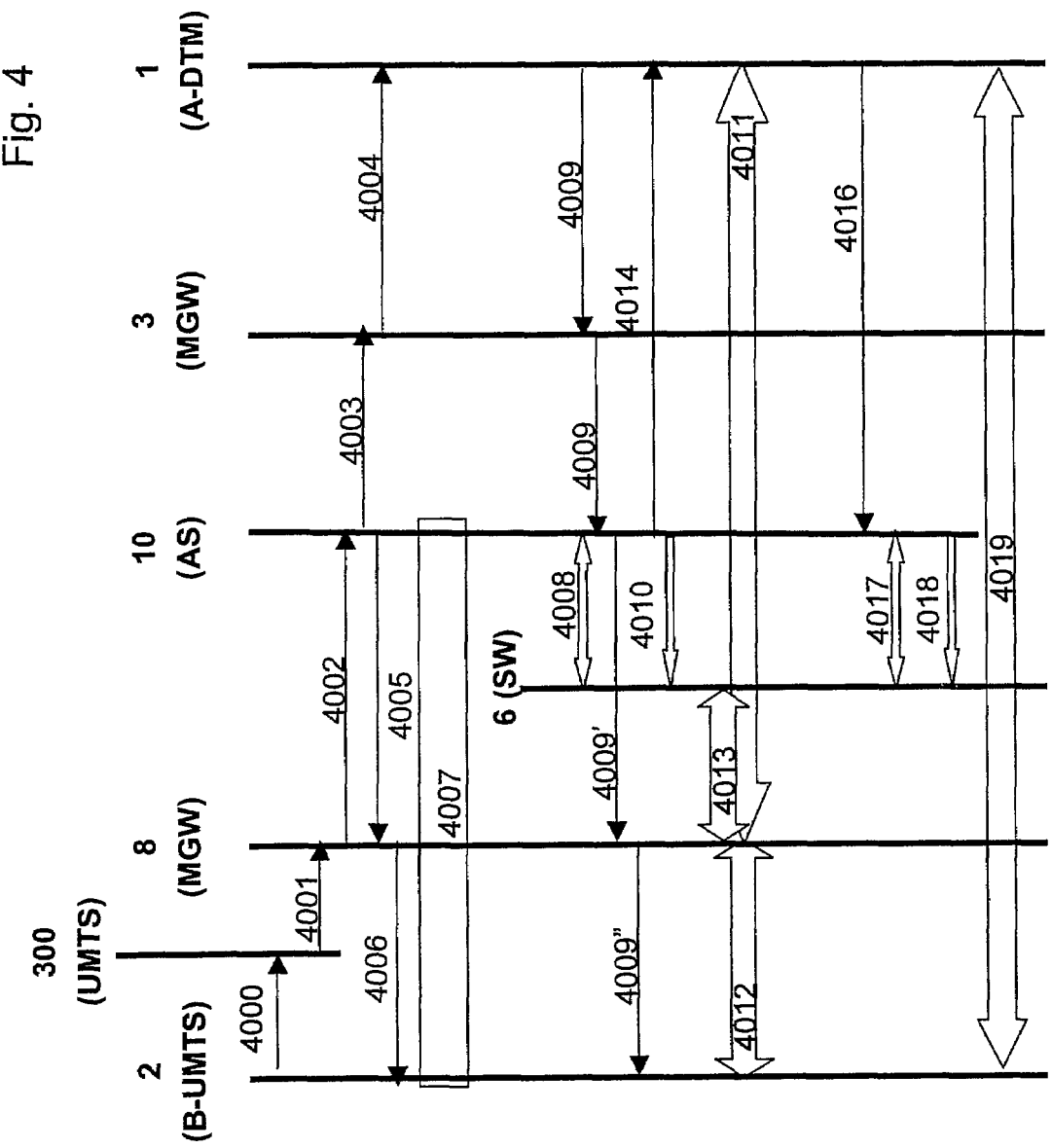
FIG. 4 is a diagram showing a second example of a communication method in accordance with the invention, wherein a request for a videocall connection is initially sent by the multimedia terminal.

FIG. 4 shows a diagram regarding another example of the method of the invention concerning the case in which the request to establish a videocall connection is initially sent by the second terminal 2 (e.g. the UMTS terminal). In greater detail, the second terminal 2 tries to establish a videocall with the first terminal 1 sending a conventional videocall request 4000 on the UMTS network 300. The UMTS network 300, after having tried to establish this videocall, determines that the first terminal 1 is not enabled to support the multimedia connection. Then, the UMTS network 300 sends towards the application server 10, via the second conversion apparatus 8, a message (4001) requesting that a videocall has to be established with the first terminal 1. The second conversion apparatus 8 converts the message 4001 into a corresponding SIP message 4002 inviting for a videocall connection which is, in turn, transmitted to the application server 10.

The application server 10 receives the invite 4002 and, by looking up, for example, the IMEI Server 12 checks whether the first terminal 1 is able to support DTM service. Therefore, the application server 10 sends to the first conversion apparatus 3 an invite message 4003 initially requesting only an audio connection and not a videocall connection.

The first conversion apparatus 3 converts the SIP message 4003, received from the application server 10, into a circuit signalling message 4004 requesting the audio call and forwards it to the first terminal 1. The application server 10 sends to the second terminal 2 and via the second conversion apparatus 8 a waiting message (4005, 4006).

A codec negotiation 4007 occurs between the application server 10 and the second terminal 2 and, then, the application server 10 sets (4008) the ports of the switch apparatus 6 in order to supply a video to the second terminal 2 which is downloaded from the repository apparatus 7.

With confirmation messages 4009, the first terminal 1 indicates to the application server 10, and by means of a conversion performed by the first conversion apparatus 3, that an audio call can be established. The application server 10 forwards (4009', 4009") the confirmation messages emitted by the first terminal 1 to the second terminal 2 and transmits to the switch apparatus 6 a command signal 4010 in order to enable a communication session between said switch and the first conversion apparatus 3.

Thus, an audio conversation between the first 1 and the second terminal 2 may be carried out (4011, 4012) and a video is supplied (4012, 4013) to the second terminal 2. Further video contents generated and transmitted by the second terminal 2 reach the switch apparatus 6 where they are, for example, not forwarded to the first terminal 1. Alternatively, the video content sent by the second terminal can be stored in the repository apparatus 7 and furnished to the first terminal 1 when the combinational session will be set up.

The first terminal 1 receive the invite message 4014 (through the packet subnetwork 100) and sends to the application sever 10 a confirmation message 4016 with which accepts the video connection, so as to establish a combinational session. The application server 10 configures (4017)

the ports of the switching apparatus 6 to receive videos from the first terminal 1 and send them to the second terminal 2, and vice versa. The application server 10, by means of an enabling message 4018, causes the switching of the switch apparatus 6 in the second configuration set up by the message 4017. Then, the exchange (4019) of video and audio contents on the established connections can be carried out.

It has to be observed that the above described method allows the second terminal 2 to establish a videocall and receiving videos (from the repository apparatus 7) when the first terminal 1 has accepted to establish the audio connection (4009), without the need to wait for the acceptance (4016) of the request to establish also the video connection.

Moreover, the application server 10 can be, advantageously, configured in such a way that in case the first terminal 1 refuses the invite message 4014 requesting the video connection by transmitting a reject message (instead of transmitting the confirmation messages 4016), the already established video connection with the repository apparatus 7 and audio connection are kept on. On the other hand, in case the first terminal 1 refuses to establish the audio call (i.e. it rejects the message 4004) no connection is established between the first terminal, the second terminal 2 and the repository apparatus 7.

With reference to the scenarios described in connection with FIGS. 1 to 4, the communication method may, advantageously, apply a specific operating logic in order to ensure that a communication between the terminals, even if of different typologies, will be set up in any case. For example, as shown in FIG. 4 when a videocall is requested by an UMTS terminal and the other terminal cannot support the UMTS videocall (because it is, for example, a DTM terminal or is a UMTS terminal for which the network 1000 cannot furnish this service) a procedure to establish a combinational session with the other terminal is started. In the case in which no multimedia connections (i.e. no videocalls) and no combinational sessions can be set up, the system 1000 can provide for the establishing of an audio call between the two terminals. This behaviour of the system 1000 can be ensured by suitably programming, for example, the application server 10 which plays the role of control element for the services.

The described communication method is particularly advantageous since it offers a procedure for establishing combinational sessions coupled to multimedia connections that achieve an interworking between different types of terminals by means of a reduced number of signalling steps and which can be implemented in a completely automatic manner.

With reference to the situation above described in which the first user A of the first terminal 1, supporting combinational sessions, whishes to exchange audio and video contents with the second terminal 2, supporting multimedia connections, the disclosed procedure of setting up a multimedia type connection (e.g. a videocall) at the second terminal 2, even if the first terminal 1 has initially requested only a single media type connection (e.g. an audiocall) and not yet the connection supporting the other media content (e.g. a video content), allows to easily and quickly establish the other single type connection (e.g. video connection) substantially as soon as this request is generated by the first terminal 1. This solution avoids a waiting period which would have been necessary in order to switch from an initial audiocall between the two terminals towards multimedia and combinational connections to be established.

Moreover, its has to be noticed that the implementation of efficient procedures allowing an interworking between multimedia connections and combinational sessions are needed, as in many countries or regions the communication technologies supporting combinational sessions (e.g. DTM/EDGE) and the ones supporting multimedia connections (e.g. UMTS) coexist. It has also to be noticed that, probably, combinational session technologies will be never completely replaced with multimedia connection technologies. Therefore, the situations above described, in which an exchange of audio and video contents between terminals supporting different technologies is achieved, arouse great interest.

In addition, the teachings of the invention allow an integration of multimedia services and combinational service which does not deprive the user of the advantages of the two single services. Particularly, the specific possibility offered by combinational services that permits to enrich with videos an already set up audio connections have been maintained in the communication method described and its integration with the videocall can be performed in a simple manner.

The invention claimed is:

1. A communication method between a first terminal and a second terminal on a communications network, comprising:
   establishing a first connection between said terminals, the first connection being of a first media type at the first terminal and of a multimedia type at the second terminal;
   establishing a second connection between a repository apparatus and the second terminal, the second connection being coupled to said first connection and being of a second media type at the repository apparatus different from said first media type, said multimedia type comprising the first and the second media types;
   disabling said second connection after a request for a third connection between said terminals, said third connection being of said second media type at the first terminal; and
   establishing the third connection, the first and third connections forming a combinational session at the first terminal and a multimedia type connection at the second terminal.

2. The method according to claim 1, wherein at least one of said first and second terminals comprises a mobile terminal and said network comprises a telephone mobile network.

3. The method according to claim 1, wherein said first media type is audio media, said second media type is data media, and said multimedia type is audio-data media.

4. The method according to claim 3, wherein said second media type is video.

5. The method according to claim 1, wherein establishing the first connection comprises establishing a corresponding connection based on a circuit subnetwork and establishing the third connection comprises establishing a corresponding connection based on a packet subnetwork.

6. The method according to claim 1, wherein said first terminal is a combinational terminal and said second terminal is a multimedia terminal adapted to support video-calls.

7. The method according to claim 1, further comprising:
   merging in a first conversion apparatus first media type content transmitted by the first terminal on the first connection and second media type content transmitted by the repository apparatus on the second connection to form a multimedia content; and
   transmitting said multimedia content toward the second terminal.

8. The method according to claim 7, wherein the second media type content transmitted by the repository apparatus comprises a content of at least one of video, image, advertising, and waiting message.

9. The method according to claim 7, further comprising:
merging in the first conversion apparatus further content of the first and second media types transmitted by the first terminal, respectively on the first and third connections to form a further multimedia content; and
transmitting said further multimedia content toward the second terminal.

10. The method according to claim 9, wherein establishing the third connection further comprises:
configuring the switch apparatus in a second operative condition in which the switch apparatus receives corresponding second media type content from the first terminal and transmits corresponding second media type content toward the first conversion apparatus.

11. The method according to claim 10, wherein configuring the switch apparatus in a second operative condition comprises:
switching receiving/transmitting ports of said switch apparatus from the first operative condition to the second operative condition.

12. The method according to claim 11, further comprising:
providing a control device for receiving and transmitting signalling messages to control the communication method.

13. The method according to claim 9, wherein said first conversion apparatus further performs a conversion into signals propagating on a corresponding circuit subnetwork of received packet flows, and vice versa.

14. The method according to claim 7, further comprising:
splitting in the first conversion apparatus, emitted multimedia content transmitted by the second terminal on the first connection into a first media type content and a second media type content; and
transmitting the first media type content toward the first terminal on said first connection.

15. The method according to claim 14, further comprising:
transmitting further second media type content toward the first terminal on said third connection.

16. The method according to claim 7, wherein establishing the second connection between the repository apparatus and the second terminal comprises:
configuring a switch apparatus in a first operative condition in which the switch apparatus is connected to said repository apparatus for receiving said second media type content and to transmit the second media type content toward the first conversion apparatus.

17. The method according to claim 16, further comprising:
transmitting on said first connection and from the first terminal said first media type content under the form of an audio signal propagating on a circuit subnetwork; and
receiving said audio signal at a second conversion apparatus and converting said audio signal into a corresponding audio packet flow propagating on a packet subnetwork.

18. The method according to claim 17, further comprising:
transmitting the audio packet flow toward the switch apparatus.

19. The method according to claim 17, further comprising:
transmitting on said third connection and from the first terminal said second media type content under the form of a video packet flow propagating on a packet subnetwork; and
receiving said video flow at the switch apparatus.

20. The method according to claim 19, further comprising performing a synchronization of said audio packet flow and video packet flow.

21. The method according to claim 17, wherein said second conversion apparatus converts signalling messages propagating on the circuit subnetwork into signalling messages propagating on the packet subnetwork, and vice versa, which are capable of being adapted to be processed by said control device.

22. The method according to claim 21, wherein the first terminal comprises a dual transfer mode terminal and the second terminal is a universal mobile telecommunications system terminal.

23. A communications network comprising:
a first terminal supporting combinational sessions;
a second terminal supporting connections of the multimedia type, the first and second terminals capable of being adapted to establish a first connection between said terminals, the first connection being of a first media type at the first terminal and of said multimedia type at the second terminal;
a repository apparatus storing second media type content and capable of being adapted to establish a second connection toward the second terminal, the second connection capable of being coupled to said first connection and comprising a second media type at the repository apparatus different from said first media type, said multimedia type comprising the first and the second media types; and
a switch apparatus capable of being adapted to selectively assume:
a first operative condition in which the switch apparatus is connected to said repository apparatus for forwarding the second media type content to the second terminal and the first and second connections are established, and
a second operative condition in which the switch apparatus is disconnected from the repository apparatus and is connected to the first terminal in the second operative condition, a third connection of said second media type at the first terminal being established, the first and third connections forming a combinational session at the first terminal and a multimedia type connection at the second terminal.

24. The network according to claim 23, wherein at least one of said first and second terminals comprises a mobile terminal and said network comprises a mobile network.

25. The network according to claim 23, further comprising a conversion apparatus capable of merging first content of the first media type and second content of the second media type to form third content of the multimedia type and splitting the third content of the multimedia type into separated corresponding contents of the first and second media types.

* * * * *